(12) United States Patent
Tang

(10) Patent No.: US 10,939,327 B2
(45) Date of Patent: Mar. 2, 2021

(54) SYSTEM FOR PERFORMING SPLIT BEARER OPERATION USING PACKET DATA CONVERGENCE PROTOCOL (PDCP)

(71) Applicant: Guangdong OPPO Mobile Telecommunications Corp., Ltd., Guangdong (CN)

(72) Inventor: Hai Tang, Dongguan (CN)

(73) Assignee: Guangdong OPPO Mobile Telecommunications Corp., Ltd., Guangdong (CN)

( * ) Notice: Subject to any disclaimer, the term of this patent is extended or adjusted under 35 U.S.C. 154(b) by 0 days.

(21) Appl. No.: 16/829,915

(22) Filed: Mar. 25, 2020

(65) Prior Publication Data
US 2020/0229036 A1 Jul. 16, 2020

Related U.S. Application Data

(63) Continuation of application No. PCT/CN2017/103523, filed on Sep. 26, 2017.

(51) Int. Cl.
*H04W 28/08* (2009.01)
*H04W 80/02* (2009.01)
(Continued)

(52) U.S. Cl.
CPC ......... *H04W 28/085* (2013.01); *H04W 80/02* (2013.01); *H04W 80/08* (2013.01); *H04W 84/20* (2013.01)

(58) Field of Classification Search
CPC ... H04W 28/085; H04W 80/02; H04W 80/08; H04W 84/20; H04W 72/04; H04W 28/0278
See application file for complete search history.

(56) References Cited

U.S. PATENT DOCUMENTS

| 10,609,589 B2 * | 3/2020 | Loehr | H04W 28/0205 |
| 2020/0107215 A1 * | 4/2020 | Lee | H04W 28/0252 |

FOREIGN PATENT DOCUMENTS

| CN | 105432111 | 3/2016 |
| CN | 106211352 | 12/2016 |

(Continued)

OTHER PUBLICATIONS

International Patent Application No. PCT/CN2017/103523, "International Search Report", Jun. 29, 2018, 2 pages.
(Continued)

*Primary Examiner* — Ian N Moore
*Assistant Examiner* — Rushil Parimal Sampat
(74) *Attorney, Agent, or Firm* — Finnegan, Henderson, Farabow, Garrett & Dunner, LLP

(57) ABSTRACT

A method includes determining, by a terminal device, a relation of size between an amount of data to be sent of a first split bearer of the terminal device and a preset threshold of the first split bearer, wherein the amount of the data to be sent includes a total amount of data volume in a PDCP layer of the first split bearer and an amount of data in a first RLC layer that is configured by a network side on the first split bearer and that is used to transmit data by default. The method also includes determining according to the relation of size in a plurality of cell groups corresponding to the first split bearer, a target cell group used to process the data to be sent according to the relation of size. The method facilitates load balance between cell groups and data transmission flexibility.

8 Claims, 5 Drawing Sheets

(51) Int. Cl.
*H04W 80/08* (2009.01)
*H04W 84/20* (2009.01)

(56) References Cited

FOREIGN PATENT DOCUMENTS

| CN | 106304342 | 1/2017 |
|---|---|---|
| CN | 106572479 | 4/2017 |
| WO | 2015064931 | 5/2015 |
| WO | WO 2017/018538 A1 | 2/2017 |
| WO | WO 2018/222418 A1 | 12/2018 |

OTHER PUBLICATIONS

Extended European Search Report dated Aug. 17, 2020, in corresponding European Application No. 17927507.8 (10 pages).
Ericsson, "UL Split in Dual Connectivity", 3GPP Draft; R2-1702749, vol. RAN WG2, Spokane, USA; Apr. 3, 2017-Apr. 7, 2017, Mar. 25, 2017, Retrieved from the Internet: http://www.3gpp.org/ftp/tsg_ran/WG2_RL2/TSGR2_97bis/Docs (4 pages).
Huawei et al, "A Hybrid UL Split Operation for Pre-processing", 3GPP Draft; R2-1707253, vol. RAN WG2, Qingdao, China; Jun. 27, 2017-Jun. 29, 2017, Jun. 26, 2017, Retrieved from the Internet: http://www.3gpp.org/ftp/Meetings_3GPP_SYNC/RAN2/Docs/ (3 pages).
Sequans Communications, "Threshold for NR UL Data Split Operation", 3GPP Draft; R2-1707364, vol. RAN WG2, Qingdao, China; Jun. 27, 2017-Jun. 29, 2017. Jun. 26, 2017, Retrieved from the Internet: http://www.3gpp.org/ftp/Meetings_3GPP_SYNC/RAN2/Docs/ (5 pages).
Sequans Communications, "NR UL Data Split Operation," 3GPP TSG-RAN WG2 Meeting #99, R2-1708777, Berlin Germany, Aug. 21-25, 2017 (6 pages).
Qualcomm Incorporated, "Preprocessing for UL Split", 3GPP TSG-RAN WG2 Meeting #99, R2-1708953, Berlin Germany, Aug. 21-25, 2017 (3 pages).

* cited by examiner

200

| 210 | A terminal device determines a relation of size between an amount of data to be sent of a first split bearer of the terminal device and a preset threshold of the first split bearer, where the amount of the data to be sent includes a total amount of data volume in a packet data convergence protocol PDCP layer of the first split bearer and a data volume in a first RLC layer that is configured by a network side on the first split bearer and that is used to transmit data by default |

| 220 | The terminal device determines, according to the relation of size in a plurality of cell groups corresponding to the first split bearer, a target cell group used to process the data to be sent according to the relation of size |

FIG. 3

SYSTEM FOR PERFORMING SPLIT BEARER OPERATION USING PACKET DATA CONVERGENCE PROTOCOL (PDCP)

CROSS-REFERENCES TO RELATED APPLICATIONS

This application is a continuation of and claims priority to International Patent Application PCT/CN2017/103523, filed on Sep. 26, 2017, the contents of which are hereby incorporated by reference in their entirety.

BACKGROUND OF THE INVENTION

Technical Field

Embodiments of this application relate to the communications field, and more specifically, to a data processing method and a terminal device.

Related Art

When a protocol architecture of a split bearer (split bearer) is used for a data bearer, a packet data convergence protocol (PDCP) is associated with two or more radio link control (RLC), and each RLC corresponds to one cell group. When uplink data needs to be transmitted on a split bearer, how a terminal device selects a cell group to process data is a problem needing to be resolved.

SUMMARY OF THE INVENTION

In view of this, embodiments of this application provide a data processing method and a terminal device, thereby improving data transmission flexibility.

According to a first aspect, a data processing method is provided. The method includes: determining, by a terminal device, a relation of size between an amount of data to be sent of a first split bearer of the terminal device and a preset threshold of the first split bearer, where the amount of the data to be sent includes a total amount of data volume in a packet data convergence protocol PDCP layer of the first split bearer and an amount of data preprocessed by a first RLC layer that is configured by a network side on the first split bearer and that is used to transmit data by default; and determining, by the terminal device according to the relation of size in a plurality of cell groups corresponding to the first split bearer, a target cell group used to process the data to be sent according to the relationship of size.

When data of a split bearer is preprocessed, the target cell group used to process the data to be sent is selected according to a relation of size between a total amount of data volume that has not been preprocessed and an amount of preprocessed data and a threshold of the split bearer, thereby facilitating load balance between cell groups and improving data transmission flexibility.

Optionally, the PDCP layer of the first split bearer is associated with two RLC layers, where a cell group corresponding to one RLC layer may be a master cell group, and a cell group corresponding to the other RLC layer may be a secondary cell group. The PDCP may be located in the master cell group or the secondary cell group.

Optionally, the data to be sent of the first split bearer may be a sum of a current amount of data in the PDCP layer and an amount of data in any RLC layer on which data preprocessing has been performed.

In a possible implementation, the determining, by the terminal device according to the relation of size in a plurality of cell groups corresponding to the first split bearer, a target cell group used to process the data to be sent according to the relationship of size includes: determining, by the terminal device, a cell group corresponding to the first RLC layer as the target cell group if the amount of the data to be sent is less than the threshold.

In a possible implementation, the determining, by the terminal device according to the relation of size in a plurality of cell groups corresponding to the first split bearer, a target cell group used to process the data to be sent according to the relationship of size includes: determining, by the terminal device, at least two cell groups corresponding to the first split bearer as target cell groups if the amount of the data to be sent is greater than or equal to the threshold.

In a possible implementation, the at least two RLC layers include the first RLC layer.

In a possible implementation, the method further includes: sending, by the terminal device, a buffer status report BSR to the target cell group, where the BSR is used to indicate the amount of the data to be sent.

In a possible implementation, the method further includes: sending, by the terminal device before the terminal device receives an uplink grant used to submit the data to be sent, at least part of data in the PDCP layer to an RLC layer of the first split bearer corresponding to the target cell group before the terminal device receives an uplink grant used for transmitting the to-be-sent data.

In a possible implementation, the method further includes: sending, by the terminal device, the data to be sent to the target cell group on condition that the terminal device receives the uplink grant from the target cell group used for transmitting the data to be sent.

In a possible implementation, the determining, by a terminal device, a relation of size between an amount of data to be sent of a first split bearer of the terminal device and a preset threshold of the first split bearer includes: determining, by the terminal device, the relation of size when the terminal device needs to send the BSR used to indicate the amount of the data to be sent.

In a possible implementation, the determining, by a terminal device, a relation of size between an amount of data to be sent of a first split bearer of the terminal device and a preset threshold of the first split bearer includes: determining, by the terminal device, the relation of size when the first RLC layer is preprocessing at least part of the data to be sent.

In a possible implementation, the determining, by a terminal device, a relation of size between an amount of data to be sent of a first split bearer of the terminal device and a preset threshold of the first split bearer includes: determining, by the terminal device, the relation of size when the terminal device receives the uplink grant used to transmit the data to be sent.

According to a second aspect, a terminal device is provided. The terminal is configured to perform the method according to the first aspect or any possible implementation of the first aspect. Specifically, the terminal device includes a unit configured to perform the method according to the first aspect or any possible implementation of the first aspect.

According to a third aspect, a terminal device is provided. The terminal device includes a memory, a processor, an input interface, and an output interface. The memory, the processor, the input interface, and the output interface are connected by using a bus system. The memory is configured to store an instruction, and the processor is configured to execute the instruction stored in the memory, to perform the method according to the first aspect or any possible implementation of the first aspect.

According to a fourth aspect, a computer storage medium is provided. The computer storage medium is configured to store a computer software instruction used to perform the method according to the first aspect or any possible implementation of the first aspect, and computer software instruction includes a program designed to perform the foregoing aspect.

According to a fifth aspect, a computer program product including an instruction is provided. When the computer program product is run on a computer, the computer is enabled to perform the method according to the first aspect or any possible implementation of the first aspect.

The aspects or other aspects of this application are more concise and easily understandable in descriptions in the following embodiments.

BRIEF DESCRIPTION OF THE DRAWINGS

FIG. 3 is a schematic block diagram of a data processing method according to an embodiment of this application;

DETAILED DESCRIPTION OF THE INVENTION

Figure 1:
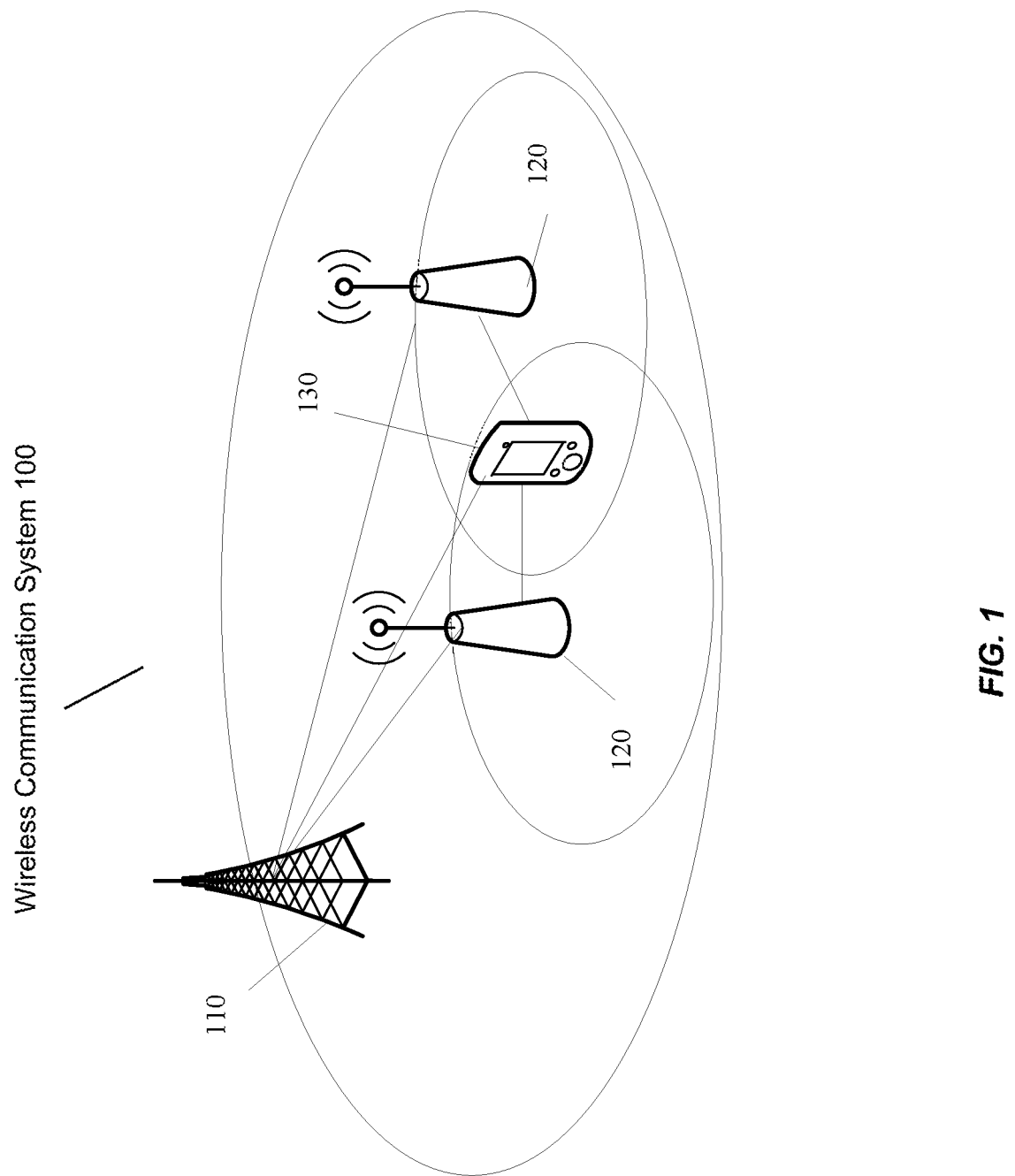
FIG. 1 is a schematic diagram of an application scenario according to an embodiment of this application.

The following clearly and completely describes the technical solutions in the embodiments of this application with reference to the accompanying drawings in the embodiments of this application.

It should be understood that the technical solutions in the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a new radio (NR) system, or a future 5G system.

Particularly, the technical solutions in the embodiments of this application may be applied to various communications systems based on a non-orthogonal multiple access technology, such as sparse code multiple access (SCMA) system and a low density signature (LDS) system. Certainly, the SCMA system and the LDS system may also be named differently in the communications field. Further, the technical solutions in the embodiments of this application may be applied to a multi-carrier transmission system using a non-orthogonal multiple access technology, such as an orthogonal frequency division multiplexing (OFDM) system, a filter bank multicarrier (FBMC) system, a generalized frequency division multiplexing (GFDM) system, and a filtered-orthogonal frequency division multiplexing (F-OFDM) system that use the non-orthogonal multiple access technology.

In the embodiments of this application, the terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN). This is not limited in the embodiments of this application.

The network device in the embodiments of this application may be a device configured to communicate with the terminal device. The network device may be a base transceiver station (BTS) in GSM or CDMA, a NodeB (NB) in a WCDMA system, an evolved NodeB (eNB or eNodeB) in an LTE system, or a wireless controller in a cloud radio access network (CRAN) scenario. Alternatively, the network device may be a relay station, an access point, an in-vehicle device, a wearable device, a network device in a future 5G network, or a network device in a future evolved PLMN network. This is not limited in the embodiments of this application.

FIG. 1 is a schematic diagram of an application scenario according to an embodiment of this application. Network devices surrounding a terminal device 130 in FIG. 1 include a primary network device 110 and the at least one secondary network device 120. The at least one secondary network device 120 is separately connected to the primary network device 110, to implement multi-connectivity, and is separately connected to the terminal device 130 to serve the terminal device 130. The terminal device 130 may simultaneously establish a connected to the secondary network device 120 by using the primary network device 110. A connection established between the terminal device 130 and the primary network device 110 is a primary connection, and a connection established between the terminal device 130 and the secondary network device 120 is a secondary connection. Control signaling of the terminal device 130 may be transmitted through the primary connection, and data of the terminal device may be transmitted through both the primary connection and the secondary connection, or may be transmitted through only the secondary connection.

In this embodiment of this application, the primary network device may be, for example, a macrocell (Macrocell), and the secondary network device may be, for example, a microcell (Microcell), a picocell (Picocell), or a femtocell (Femtocell). However, this embodiment of the present invention is not limited thereto.

Figure 2:
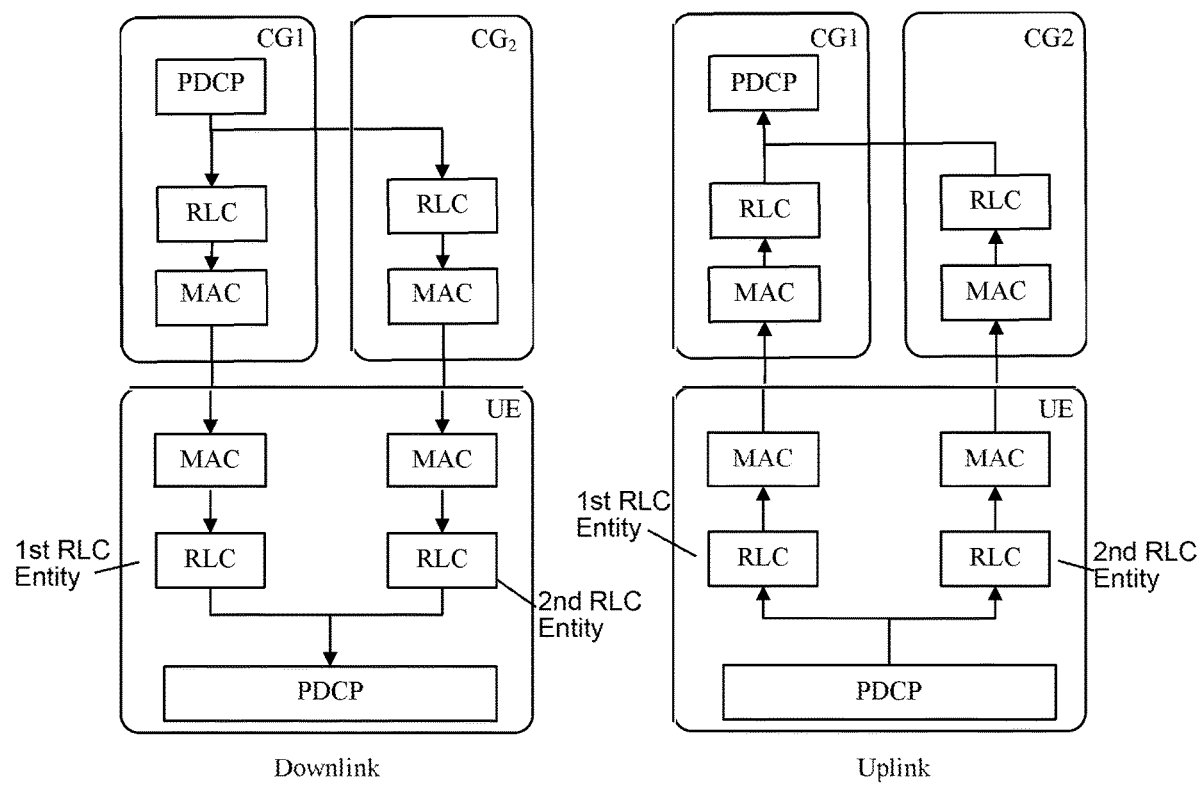
FIG. 2 is a protocol architecture diagram of a split bearer in a dual-connectivity scenario.

A person skilled in the art understands that, one PDCP may be associated with two or more RLCs. In this way, a bearer may be referred to as a split bearer. A protocol architecture of a split bearer in a dual-connectivity scenario is simply described with reference to FIG. 2. For uplink and downlink, a PDCP is located in a cell group (CG), and the CG is an anchor cell group (anchor CG). The CG includes a master cell group and a secondary cell group. The PDCP may send a PDCP protocol data unit (PDU) to an RLC of the master cell group and the secondary cell group, so that data can be transmitted by using two connections. The data passes through RLCs and media access control (MAC) of different cell groups, then arrives at a corresponding MAC and RLC layer of a terminal (downlink) or a base station (uplink) by passing through an air interface, and at last is aggregated into a PDCP, thereby finally submitting the data to a higher layer.

In LTE, for each split bearer, a threshold is defined in a protocol. When an amount of data in a PDCP is less than the threshold, a user reports a BSR to a default CG, and when an uplink resource grant of the CG arrives, sends data to a lower layer to form an RLC PDU. When an amount of data in a PDCP is greater than the threshold, a user reports a BSR to two CGs, and when an uplink resource grant of any one of the CGs arrives, sends data to a lower layer to form an RLC PDU. In LTE, after higher layer data arrives, the data stays on the PDCP layer, and when an uplink resource grant of a master cell group or a secondary cell group arrives at the terminal device, the terminal device sends the data to an RLC layer of the master cell group or the secondary cell group, so as to be finally sent to a network side. A disadvantage of such a processing manner is that the terminal device can deliver the data from the PDCP to the RLC only when the uplink resource grant arrives at the terminal device, to generate an RLC PDU, and further generate a MAC PDU, requiring an excessively high instantaneous processing capability of the terminal device.

In NR, preprocessing (pre-processing) is proposed for the problem. That is, a terminal device is allowed to deliver data from a PDCP to an RLC before an uplink resource grant arrives at the terminal device, to generate an RLC PDU, and after the uplink resource grant arrives, a MAC PDU is generated, thereby lowering a requirement on an instantaneous processing capability of UE. When the terminal device is preprocessing data of a split bearer, how to determine, with reference to the threshold defined for the split bearer in LTE, a cell group serving the terminal device, to implement load balance between cell groups is a problem needing to be resolved.

It should be understood that, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that, in this application, mostly, an example in which a split bearer is connecting one PDCP to two RLCs is used for description. However, the embodiments of this application are not limited thereto.

FIG. 3 is a schematic block diagram of a data processing method 200 according to an embodiment of this application. As shown in FIG. 3, the method 200 includes some of all of the following content:

S210. A terminal device determines a relation of size between an amount of data to be sent of a first split bearer of the terminal device and a preset threshold of the first split bearer, where the amount of the data to be sent includes a total amount of data volume in a packet data convergence protocol PDCP layer of the first split bearer and an amount of data preprocessed by a first RLC layer that is configured by a network side on the first split bearer and that is used to transmit data by default.

S220. The terminal device determines, according to the relation of size in a plurality of cell groups corresponding to the first split bearer, a target cell group used to process the data to be sent according to the relationship of size.

Specifically, a threshold may be agreed on in a protocol for each split bearer of the terminal device, or a network side may configure a threshold for the terminal device. Before the terminal device receives an uplink grant, the terminal device may first deliver some or all data in a PDCP of a split bearer to some RLCs of the split bearer. In this case, when the terminal device performs comparison, the terminal device may compare the threshold of the split bearer with a sum of an amount of preprocessed data of the split bearer and an amount of data that has not been preprocessed. It should be understood that, some RLCs of the split bearer can be preprocessed, and some RLCs cannot be preprocessed. The preprocessed data is data that is sent by the terminal device from the PDCP of the split bearer to an RLC that is of the split bearer and that has a preprocessing capability. For example, the network device may pre-configure, for the terminal device, an RLC having a preprocessing capability as a default RLC. In this case, when the terminal device preprocesses data to be sent of the split bearer, the terminal device sends part of data from the PDCP of the split bearer to the default RLC. After comparing the threshold with the sum of the amount of data in the PDCP and the amount of preprocessed data in the RLC of the same split bearer, the terminal device may determine, according to a relation of size, the target cell group for processing the data to be sent. It should be understood that, different RLCs of a same split bearer may correspond to different cell groups. The target cell group may be a cell group, or may be a plurality of cell group. This is not limited in this embodiment of this application.

Therefore, in the data processing method in this embodiment of this application, when data of a split bearer is preprocessed, the target cell group used to process the data to be sent is selected according to a relation of size between a total amount of data volume that has not been preprocessed and an amount of preprocessed data and a threshold of the split bearer, thereby facilitating load balance between cell groups and improving data transmission flexibility.

Optionally, in this embodiment of this application, the determining, by the terminal device according to the relation of size in a plurality of cell groups corresponding to the first split bearer, a target cell group used to process the data to be sent according to the relationship of size includes: determining, by the terminal device, a cell group corresponding to the first RLC layer as the target cell group if the amount of the data to be sent is less than the threshold.

Optionally, in this embodiment of this application, the determining, by the terminal device according to the relation of size in a plurality of cell groups corresponding to the first split bearer, a target cell group used to process the data to be sent according to the relationship of size includes: determining, by the terminal device, at least two cell groups corresponding to the first split bearer as target cell groups if the amount of the data to be sent is greater than or equal to the threshold.

Specifically, it is assumed that data of a split bearer of the terminal device is delivered from the PDCP to an RLC before an uplink grant is received, the terminal device may compare a threshold of the split bearer with a total amount of data volume in the PDCP and an amount of data in the RLC. If a comparison result is less than the threshold, it may be considered that a current requirement can be satisfied by using only one connection, and the terminal device may select a cell group corresponding to an RLC of the split bearer to process the current data. If the comparison result is greater than the threshold, it may be considered that the current requirement cannot be satisfied by using only one connection, and the terminal device may select a plurality of cell groups corresponding to the split bearer to process the current data.

For example, the network side configures a default RLC for a split bearer 1 of the terminal device to process data. Before receiving an uplink grant for the split bearer 1, the terminal device sends data of the split bearer 1 from the PDCP to the default RLC in advance. After receiving the uplink grant for the split bearer 1, the terminal device directly sends, to a cell group corresponding to the default RLC, the data that is sent to the default RLC in advance. Meanwhile, the terminal device delivers, to the default RLC and a MAC, data that is in the PDCP and that has not been preprocessed, and then to the cell group corresponding to the default RLC through an air interface.

For another example, a split bearer 1 of the terminal device is associated with two RLCs: an RLC 1 and an RLC 2. The RLC 1 and the RLC 2 both have a preprocessing function. Before receiving an uplink grant for data to be sent of the split bearer 1, the terminal device already sends data 1 and data 2 of the split bearer 1 respectively to the RLC 1 and the RLC 2 in advance. The terminal device may compare a threshold of the split bearer 1 with a total amount of data volume in the RLC 1, an amount of data in the RLC 2 and a current amount of data in the PDCP, or the terminal device may compare a threshold of the split bearer 1 with a total amount of data volume in the RLC 1 or the RLC 2 and a current amount of data in the PDCP. If the sum is greater than the threshold, the terminal device may select cell groups corresponding to both the RLC 1 and the RLC 2 as target cell groups. That is, data preprocessed in the RLC 1 and the RLC 2 can directly arrive at corresponding cell groups by passing through air interfaces, while the data that is in the PDCP and that has not been preprocessed needs to arrive at corresponding cell groups by passing through the RLC 1 and the RLC 2 and then passing through the air interfaces. If the sum is less than the threshold, the terminal device selects a cell group corresponding to either the RLC 1 or the RLC 2 as the target cell group. That is, before receiving the uplink grant for the split bearer 1, the terminal device may send the data of the split bearer 1 to the RLC 1 rather than the RLC 2, and compare the threshold of the split bearer 1 with a sum of an amount of preprocessed data in the RLC 1 and a current amount of data in the PDCP. Alternatively, the terminal device may send the data of the split bearer 1 to the RLC 2 rather than the RLC 1, and compare the threshold of the split bearer 1 with a sum of an amount of preprocessed data in the RLC 2 and a current amount of data in the PDCP.

Optionally, when the terminal device selects cell groups corresponding to at least two RLC layers of the first split bearer as the target cell groups, the at least two RLC layers may include the first RLC layer that is configured by the network side and that is used to transmit data by default.

Optionally, in this embodiment of this application, the method further includes: sending, by the terminal device, a buffer status report (BSR) to the target cell group, and the BSR is used to indicate the amount of the data to be sent.

A person skilled in the art understands that the BSR is used to provide, for a service network, information indicating a total amount of data of UE that is stored in an uplink buffer and that needs to be sent. Once the terminal device determines the target cell group, the terminal device can report a BSR for a specific split bearer to a network of the target cell group. If the terminal device determines a plurality of target cell groups, the terminal device may respectively report corresponding BSRs respectively to the plurality of cell groups. For example, the split bearer 1 of the terminal device connects two RLCs: an RLC 1 and an RLC 2. The RLC 1 and the RLC 2 both have a preprocessing function. Before receiving the uplink grant for the data to be sent of the split bearer 1, the terminal device already sends data 1 and data 2 of the split bearer 1 respectively to the RLC 1 and the RLC 2 in advance. Assuming that the target cell groups determined by the terminal device include a cell group corresponding to the RLC 1 and a cell group corresponding to the RLC 2, the terminal device may report a BSR to the cell group corresponding to the RLC 1, to indicate a sum of a current amount of data in the PDCP and an amount of data preprocessed in the RLC 1. The terminal device may further report a BSR to the cell group corresponding to the RLC 2, to indicate a sum of a current amount of data in the PDCP and an amount of data preprocessed in the RLC 2.

Optionally, the terminal device may send the BSR to the target cell group through MAC layer signaling.

Optionally, in this embodiment of this application, the method further includes: sending, by the terminal device, the data to be sent to the target cell group on condition that the terminal device receives the uplink grant from the target cell group and that is used transmit the data to be sent.

Specifically, after determining the target cell group, provided that the terminal device receives the uplink grant sent by the target cell group, the terminal device can send data to the target cell group according to the uplink grant of the target cell group. For example, the target cell group determined by the terminal device is the cell group corresponding to the RLC 1 of the split bearer 1. The terminal device can send data to the cell group corresponding to the RLC 1 only according to an uplink grant sent by the cell group corresponding to the RLC 1. In other words, the terminal device does not send data to a cell group corresponding to another RLC of the split bearer 1, even if the terminal receives an uplink grant sent by a cell group corresponding to the another RLC.

Once the terminal device determines the target cell group, the terminal device may perform some subsequent operations, which include but are not limited to the following content:
preprocessing data for a connection of the target cell group;
reporting the BSR to the target cell group; and
submitting the data to the target cell group according to the uplink grant of the target cell group.

The terminal device may perform comparison on a split bearer and a threshold of the split bearer under the trigger of the following conditions:

Optionally, in this embodiment of this application, the determining, by a terminal device, a relation of size between an amount of data to be sent of a first split bearer of the terminal device and a preset threshold of the first split bearer includes: determining, by the terminal device, the relation of size when the terminal device needs to send the BSR used to indicate the amount of the data to be sent.

Optionally, in this embodiment of this application, the determining, by a terminal device, a relation of size between an amount of data to be sent of a first split bearer of the terminal device and a preset threshold of the first split bearer includes: determining, by the terminal device, the relation of size when the first RLC layer is preprocessing at least part of the data to be sent.

Optionally, in this embodiment of this application, the determining, by a terminal device, a relation of size between an amount of data to be sent of a first split bearer of the terminal device and a preset threshold of the first split bearer includes: determining, by the terminal device, the relation of size when the terminal device receives the uplink grant used to transmit the data to be sent.

It should be understood that, the foregoing several trigger conditions are merely for illustration, and this embodiment of this application is not limited thereto.

The terminal device can perform comparison once for one piece of data of one split bearer.

Optionally, in this embodiment of this application, the first split bearer includes two RLC layers, and cell groups corresponding to the two RLC layers include a master cell group and a secondary cell group. That is, the first split bearer is dual connectivity, where one RLC corresponds to the master cell group, and the other RLC corresponds to the secondary cell group. The PDCP of the first split bearer may be located in the master cell group or the secondary cell group.

It should be understood that, interaction between the network device and the terminal device, related features, functions, and the like of the terminal device that are described by the network device correspond to related features, functions, and the like of the terminal device. In addition, related content has been described in detail in the foregoing method 100. For brevity, details are not described herein again.

It should be further understood that, in various embodiments of this application, sequence numbers of the foregoing processes do not indicate an execution sequence. The execution sequence of the processes should be determined depending on functions and internal logic of the processes, and should not be construed as any limitation on the implementation processes of the embodiments of this application.

The data processing method according to the embodiments of this application is described above in detail. An data processing apparatus according embodiments of this application are described below with reference to FIG. 4 and FIG. 5. Technical features described in the method embodiment are applicable to the following apparatus embodiments.

Figure 4:
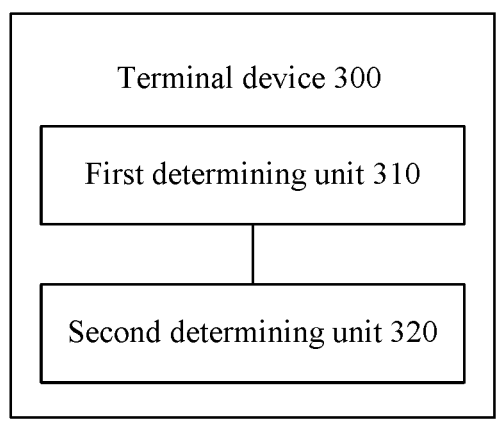
FIG. 4 is a schematic block diagram of a terminal device according to an embodiment of this application.

FIG. 4 is a schematic block diagram of a terminal device 300 according to an embodiment of this application. As shown in FIG. 4, the terminal device 300 includes:

a first determining unit 310, configured to determine a relation of size between an amount of data to be sent of a first split bearer of the terminal device and a preset threshold of the first split bearer, where the amount of the data to be sent includes a total amount of data volume in a packet data convergence protocol PDCP layer of the first split bearer and an amount of data preprocessed by a first RLC layer that is configured by a network side on the first split bearer and that is used to transmit data by default; and a second determining unit 320, configured to determine, according to the relation of size in a plurality of cell groups corresponding to the first split bearer, a target cell group used to process the data to be sent according to the relationship of size.

Therefore, when data of a split bearer is preprocessed, the terminal device in this embodiment of this application selects the target cell group used to process the data to be sent according to a relation of size between a total amount of data volume that has not been preprocessed and an amount of preprocessed data and a threshold of the split bearer, thereby facilitating load balance between cell groups and improving data transmission flexibility.

Optionally, in this embodiment of this application, the second determining unit 320 is specifically configured to determine a cell group corresponding to the first RLC layer as the target cell group if the amount of the data to be sent is less than the threshold.

Optionally, in this embodiment of this application, the second determining unit 320 is specifically configured to determine at least two cell groups corresponding to the first split bearer as target cell groups if the amount of the data to be sent is greater than or equal to the threshold.

Optionally, in this embodiment of this application, the at least two RLC layers include the first RLC layer.

Optionally, in this embodiment of this application, the terminal device 300 further includes a first sending unit, configured to send a buffer status report BSR to the target cell group, where the BSR is used to indicate the amount of the data to be sent.

Optionally, in this embodiment of this application, the terminal device 300 further includes a second sending unit, configured to send, before the terminal device receives an uplink grant used to submit the data to be sent, at least part of data in the PDCP layer to an RLC layer of the first split bearer corresponding to the target cell group before the terminal device receives an uplink grant used for transmitting the to-be-sent data.

Optionally, in this embodiment of this application, the terminal device 300 further includes a third sending unit, configured to send the data to be sent to the target cell group on condition that the terminal device receives the uplink grant from the target cell group used for transmitting the data to be sent.

Optionally, in this embodiment of this application, the first determining unit 310 is specifically configured to determine the relation of size when the terminal device needs to send the BSR used to indicate the amount of the data to be sent.

Optionally, in this embodiment of this application, the first determining unit 310 is specifically configured to determine the relation of size when the first RLC layer is preprocessing at least part of the data to be sent.

Optionally, in this embodiment of this application, the first determining unit 310 is specifically configured to determine the relation of size when the terminal device receives the uplink grant used to transmit the data to be sent.

Optionally, in this embodiment of this application, the first split bearer includes two RLC layers, and cell groups corresponding to the two RLC layers include a master cell group and a secondary cell group.

It should be understood that, the terminal device 300 according to this embodiment of this application may correspond to the terminal device in the method embodiment of this application, and the foregoing and other operations and/or functions of various units of the terminal device 300 are respectively intended to implement corresponding procedures of the method in FIG. 3. For brevity, details are not described herein again.

Figure 5:
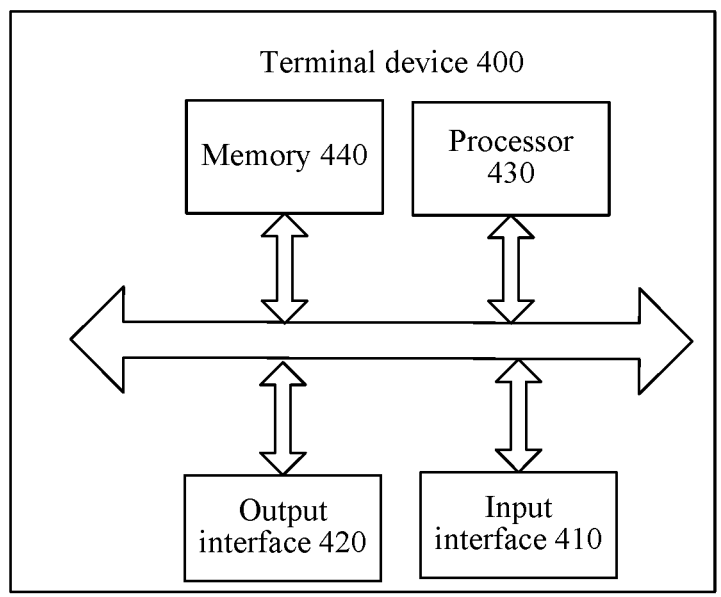
FIG. 5 is another schematic block diagram of a terminal device according to an embodiment of this application.

As shown in FIG. 5, an embodiment of this application further provides a terminal device 400. The terminal device 400 may be the terminal device 300 in FIG. 4, and can be configured to execute content of the terminal device corresponding to the method 200 of FIG. 3. The terminal device 400 includes an input interface 410, an output interface 420, a processor 430, and a memory 440. The input interface 410, the output interface 420, the processor 430, and the memory 440 may be connected by using a bus system. The memory 440 is configured to store a program, an instruction, or code. The processor 430 is configured to execute the program, the instruction, or the code in the memory 440 to: control the input interface 410 to receive a signal, control the output interface 420 to send a signal, and complete operations in the foregoing method embodiments.

Therefore, when data of a split bearer is preprocessed, the terminal device in this embodiment of this application selects the target cell group used to process the data to be sent according to a relation of size between a total amount of data volume that has not been preprocessed and an amount of preprocessed data and a threshold of the split bearer, thereby facilitating load balance between cell groups and improving data transmission flexibility.

It should be understood that, in this embodiment of this application, the processor 430 may be a central processing unit (CPU), or the processor 430 may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

The memory 440 may include a read-only memory and a random access memory, and provide an instruction and data to the processor 430. A part of the memory 440 may further include a non-volatile random access memory. For example, the memory 440 may further store information about a device type.

In an implementation process, content in the foregoing method may be completed by using an integrated logical circuit of hardware in the processor 430 or instructions in a form of software in the processor 430. The content of the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 440, and the processor 430 reads information in the memory 440 and completes the content in the foregoing method in combination with hardware of the processor. To avoid repetition, details are not described herein again.

In a specific implementation, the first determining unit and the second determining unit of the terminal device 300 may be implemented by the processor 430 in FIG. 5, and the first sending unit, the second sending unit, and the third sending unit of the terminal device 300 may be implemented the output interface 420 in FIG. 5.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for data processing, performed at a terminal device, comprising:
    submitting a part of packet data convergence protocol (PDCP) data of a first split bearer to at least one of a first Radio Link Control (RLC) or a second RLC;
    receiving an uplink grant before submitting the PDCP data of the first split bearer to the first RLC, wherein the uplink grant is configured for transmitting data to be sent of the first split bearer; and
    submitting, on condition that an amount of the data to be sent of the first split bearer is less than a preset threshold, the PDCP data of the first split bearer to the first RLC, wherein the first split bearer corresponds to a first PDCP, the PDCP data of the first split bearer comprises data in the first PDCP, the first PDCP is associated with the first RLC and the second RLC, the first RLC corresponds to a first cell group, and the second RLC corresponds to a second cell group;

wherein the data to be sent of the first split bearer comprises the PDCP data of the first split bearer, and data of the first split bearer in the first RLC.

2. The method according to claim 1, further comprising:
submitting no PDCP data of the first split bearer to the second RLC if the amount of data to be sent of the first split bearer is less than the preset threshold.

3. The method according to claim 1, wherein the data to be sent of the first split bearer further comprises data of the first split bearer in the second RLC.

4. The method according to claim 1, wherein:
the first cell group is a master cell group (MCG), and the second cell group is a secondary cell group (SCG); or
the first cell group is a SCG, and the second cell group is an MCG.

5. A terminal device comprising:
a memory configured to store computer-executable instructions; and
one or more processors in communication with the memory and configured to execute the computer-executable instructions to:
submit a part of packet data convergence protocol (PDCP) data of a first split bearer to at least one of a first Radio Link Control (RLC) or a second RLC;
receive an uplink grant before submitting the PDCP data of the first split bearer to the first RLC, wherein the uplink grant is configured for transmitting data to be sent of the first split bearer; and
submit, on condition that an amount of the data to be sent of the first split bearer is less than a preset threshold, the PDCP data of the first split bearer to the first RLC, wherein the first split bearer corresponds to a first PDCP, the PDCP data of the first split bearer comprises data in the first PDCP, the first PDCP is associated with the first RLC and the second RLC, the first RLC corresponds to a first cell group, and the second RLC corresponds to a second cell group;

wherein the data to be sent of the first split bearer comprises the PDCP data of the first split bearer, and data of the first split bearer in the first RLC.

6. The terminal device according to claim 5, wherein executing the computer-executable instructions further causes the one or more processors to:
submit no PDCP data of the first split bearer to the second RLC if the amount of data to be sent of the first split bearer is less than the preset threshold.

7. The terminal device according to claim 5, wherein the data to be sent of the first split bearer further comprises data of the first split bearer in the second RLC.

8. The terminal device according to claim 5, wherein:
the first cell group is a master cell group (MCG), and the second cell group is a secondary cell group (SCG); or
the first cell group is a SCG, and the second cell group is an MCG.

* * * * *